US009967208B2

(12) United States Patent
Rickman et al.

(10) Patent No.: US 9,967,208 B2
(45) Date of Patent: May 8, 2018

(54) OPTOELECTRONIC SWITCH

(71) Applicant: ROCKLEY PHOTONICS LIMITED, London (GB)

(72) Inventors: Andrew Rickman, Marlborough (GB); Nathan Farrington, Arcadia, CA (US)

(73) Assignee: Rockley Photonics Limited, London (GB)

( * ) Notice: Subject to any disclaimer, the term of this patent is extended or adjusted under 35 U.S.C. 154(b) by 0 days. days.

(21) Appl. No.: 15/696,145

(22) Filed: Sep. 5, 2017

(65) Prior Publication Data

US 2018/0063029 A1    Mar. 1, 2018

Related U.S. Application Data

(63) Continuation of application No. 14/715,448, filed on May 18, 2015, now Pat. No. 9,781,059, which is a
(Continued)

(30) Foreign Application Priority Data

Apr. 21, 2015   (GB) .................................. 1506729.1

(51) Int. Cl.
*G02B 6/35*   (2006.01)
*H04L 12/933*   (2013.01)
(Continued)

(52) U.S. Cl.
CPC .............. *H04L 49/10* (2013.01); *G02B 6/356* (2013.01); *H04J 14/0212* (2013.01);
(Continued)

(58) Field of Classification Search
None
See application file for complete search history.

(56) References Cited

U.S. PATENT DOCUMENTS

| 6,768,827 B2 | 7/2004 | Yoo |
| 8,493,976 B2 | 7/2013 | Lin |

(Continued)

FOREIGN PATENT DOCUMENTS

| CN | 103795654 A | 5/2014 |
| EP | 0 639 015 A2 | 2/1995 |

(Continued)

OTHER PUBLICATIONS

Farrington, Nathan et al.; "A 10 µs Hybrid Optical-Circuit/Electrical-Packet Network for Datacenters"; Optical Society of America; 2013; 3pp.
(Continued)

*Primary Examiner* — Jerry Rahll
(74) *Attorney, Agent, or Firm* — Lewis Roca Rothgerber Christie LLP

(57) ABSTRACT

An optoelectronic switch comprising: a first plurality of detector remodulators (DRMs) (C3, D1), each DRM having an integer number M of optical inputs and an integer number N of optical outputs; a second plurality of DRMs (C7, D5), each DRM having N optical inputs and M optical outputs; a passive optical switch fabric (C4+C5+C6, D2+D3+D4) connecting the N optical outputs of each of the first plurality of DRMs with the N optical inputs of each of the second plurality of DRMs, the path of an optical signal through the optical switch fabric depending upon its wavelength; wherein each DRM (C3, D1) of the first plurality of DRMs is configured to act as a tunable wavelength converter to select the desired path of an optical signal through the optical switch fabric (C4+C5+C6, D2+D3+D4); and wherein each of the first plurality of DRMs (C3, D1) includes a concentrator, the concentrator configured to aggregate optical signals received from any of the M inputs of that DRM and to buffer them according to the one of the
(Continued)

plurality of second DRMs (C7, D5) that includes their destination port.

8 Claims, 8 Drawing Sheets

Related U.S. Application Data continuation-in-part of application No. 14/639,041, filed on Mar. 4, 2015, now Pat. No. 9,417,396.

(60) Provisional application No. 62/152,696, filed on Apr. 24, 2015, provisional application No. 62/057,818, filed on Sep. 30, 2014.

(51) Int. Cl.
*H04J 14/02* (2006.01)
*H04Q 11/00* (2006.01)

(52) U.S. Cl.
CPC ...... *H04J 14/0256* (2013.01); *H04Q 11/0005* (2013.01); *H04Q 11/0071* (2013.01); *H04Q 2011/006* (2013.01); *H04Q 2011/0032* (2013.01)

(56) References Cited

U.S. PATENT DOCUMENTS

| 8,676,004 | B1 | 3/2014 | Urata et al. |
|---|---|---|---|
| 8,774,625 | B2 | 7/2014 | Binkert et al. |
| 8,792,787 | B1 | 7/2014 | Zhao et al. |
| 8,942,559 | B2 | 1/2015 | Binkert et al. |
| 9,438,970 | B2 | 9/2016 | Jones et al. |
| 2003/0133641 | A1 | 7/2003 | Yoo |
| 2007/0092248 | A1 | 4/2007 | Jennen |
| 2007/0098319 | A1 | 5/2007 | Jennen |
| 2009/0034978 | A1 | 2/2009 | Gazzola et al. |
| 2015/0277157 | A1 | 10/2015 | Jones et al. |

FOREIGN PATENT DOCUMENTS

| GB | 2523383 | 8/2015 |
|---|---|---|
| GB | 2523433 | 8/2015 |
| WO | WO 2011/076442 A1 | 6/2011 |
| WO | WO 2015/060820 A1 | 4/2015 |

OTHER PUBLICATIONS

Farrington, Nathan et al.; "Data Center Switch Architecture in the Age of Merchant Silicon"; Proceedings of the 2009 17th IEEE Symposium on High Performance Interconnects; p. 93-102, Aug. 25-27, 2009.
Great Britain Examination Report for related Application No. GB1506729.1, dated Oct. 21, 2015, 3 pages.
Great Britain Search Report for related Application No. GB1506729.1, dated May 19, 2015, 3 pages.
Gripp, Jürgen et al.; "Architectures, Components, and Subsystems for Future Optical Packet Switches"; IEEE Journal of Selected Topics in Quantum Electronics; vol. 16; No. 5; Sep./Oct. 2010; pp. 1394-1404.
Gripp, Jürgen et al.; "Optical Switch Fabrics for Ultra-High-Capacity IP Routers"; Journal of Lightwave Technology; vol. 21; No. 11; Nov. 2003; pp. 2839-2850.
International Search Report and Written Opinion for related International Application No. PCT/EP2015/072565, dated Jan. 21, 2016, 13pp.
International Search Report and Written Opinion issued in PCT/EP2015/072607, dated Apr. 25, 2016, 18 pages.
Invitation to Pay Additional Fees and Partial Search Report dated Jan. 26, 2016 in related International Application No. PCT/EP2015/072607; 7pp.
Leung, Yiu-Wing; "Design and Analysis of Packet Concentrator"; IEICE Trans. Commun., vol. E83-B; No. 5; May 2000; 7pp.
Lucerna, Diego et al.; "AWG-based architecture for optical interconnection in asynchronous systems"; IEEE 12th International Conference on High Performance Switching and Routing; 2011; 6pp.
Ngo, Hung Q. et al.; "Nonblocking WDM Switches Based on Arrayed Waveguide Grating and Limited Wavelength Conversion"; Proceedings 23rd Conference of IEEE Communications Soc.; 2004; 11pp.
Pallavi, S. et al.; "AWG Based Optical Packet Switch Architecture"; I.J. Information Technology and Computer Science; 2013; 04; pp. 30-39.
Ye, Tong et al.; "AWG-based Non-blocking Clos Networks"; IEEE/ACM Transactions on Networking; Aug. 21, 2013; 13pp.

OPTOELECTRONIC SWITCH

CROSS-REFERENCE TO RELATED APPLICATIONS

The present application is a continuation of U.S. patent application Ser. No. 14/715,448, filed May 18, 2015, which (i) claims priority to and the benefit of U.S. Provisional Patent Application Ser. No. 62/152,696, filed Apr. 24, 2015, (ii) is a continuation-in-part of U.S. patent application Ser. No. 14/639,041, filed Mar. 4, 2015, which claims priority to and the benefit of U.S. Provisional Patent Application Ser. No. 62/057,818, filed Sep. 30, 2014, and (iii) claims priority to Great Britain Application No. GB1506729.1, filed Apr. 21, 2015. All of the above applications are incorporated by reference herein, in their entirety.

FIELD OF THE INVENTION

The present invention relates to an optoelectronic switch, more particularly to an optoelectronic switch comprising a passive optical switch fabric and detector remodulators which act as tunable wavelength convertors, the detector remodulators including a concentrator.

BACKGROUND OF THE INVENTION

The present and continuing increase in data traffic volumes and the requirement for speed of switching and reduced energy consumption in datacenters has driven a great deal of recent innovation. In particular, it has been realised that optical switching offers many of the desired properties but optical devices need to be controlled by and interfaced with electronic devices including traditional electronic data servers. Optical devices themselves do not necessarily reduce the size or complexity of a switch. However, in datacenter switch architectures the array waveguide grating has a central role since it is a passive and robust device achieving routing based upon input carrier wavelength.

As an example of earlier work in the area of AWG based optical switches, U.S. Pat. No. 8,792,787 provides a hybrid optoelectronic packet switch which has several stages and layers of AWGs. This invention includes a buffering stage in the electronic domain in order to avoid blocking and there is a master scheduler which is responsible for routing an input signal across the switch fabric to the output port. The switch of U.S. Pat. No. 8,792,787 is a large device and is not scalable.

From GB1403191.8 (U.S. Ser. No. 14/629,922) detector remodulators (DRMs) are known for receiving an optical signal, regenerating and retransmitting it, either on the same or different carrier optical wavelength. From GB1420063.8 it is known that a packet switch can be built from DRMs and AWGs, the DRMs configured to route packet signals in response to a central scheduler.

There remains a desire to reduce the component count in an optoelectronic switch and to simplify the connectivity within the switch. Thus an aim of the present invention is to provide improved switch functionality whilst reducing the component count.

SUMMARY OF THE INVENTION

Accordingly, the present invention aims to solve the above problems by providing, according to a first aspect, an optoelectronic switch comprising: a first plurality of detector remodulators (DRMs) (C3, D1), each DRM having an integer number M of optical inputs and an integer number N of optical outputs; a second plurality of DRMs (C7, D5), each DRM having N optical inputs and M optical outputs; a passive optical switch fabric (C4+C5+C6, D2+D3+D4) connecting the N optical outputs of each of the first plurality of DRMs with the N optical inputs of each of the second plurality of DRMs, the path of an optical signal through the optical switch fabric depending upon its wavelength; wherein each DRM (C3, D1) of the first plurality of DRMs is configured to act as a tunable wavelength converter to select the desired path of an optical signal through the optical switch fabric (C4+C5+C6, D2+D3+D4); and wherein each of the first plurality of DRMs (C3, D1) includes a concentrator, the concentrator configured to aggregate optical signals received from any of the M inputs of that DRM and to buffer them according to the one of the plurality of second DRMs (C7, D5) that includes their destination port.

In this way, the optoelectronic switch of the present invention provides a greater switch functionality by employing a concentrator function within the DRM. This enables alternative switch architectures involving a reduction in the component count within the optoelectronic switch as well as simplifying the connectivity within the switch.

Scheduling algorithms may be chosen to implement Virtual output queuing. Virtual output queueing enables an improved throughput performance, addressing "head-of-line blocking" that can arise in prior art systems.

Optional features of the invention will now be set out. These are applicable singly or in any combination with any aspect of the invention.

The detector remodulator may comprise: waveguide platform including: a detector coupled to a first input waveguide; a modulator coupled to a second input waveguide and an output waveguide; and an electrical circuit connecting the detector to the modulator; wherein the modulator includes a modulation waveguide region at which a semiconductor junction is set horizontally across the waveguide.

The modulation region may be a phase modulation region or an amplitude modulation region and the waveguide platform may take the form of a silicon on insulator (SOI) platform. The detector, modulator, second input waveguide and output waveguide of the DRM may be arranged within the same horizontal plane as one another.

The electrical circuit of the DRM includes the concentrator and may take the form of an Application Specific Integrated Circuit (ASIC). This application specific integrated circuit may be any multi-functional CMOS chip.

Each electronic circuit of a DRM may take the form of a CMOS chip which, in addition to the concentrator, may include one or more of the following: a receiver circuit, a transimpedance circuit, gain circuitry, signal regeneration circuitry, and a modulator driver. The signal regeneration circuitry may include signal retiming and signal reshaping.

It is envisaged that each DRM above (i.e. each DRM module) may actually be a shared module comprising a plurality of detectors and a plurality of modulators, the plurality of modulators connected to the plurality of detectors by a single electronic chip. The single electronic chip containing one or more of the circuitry features described in the paragraph above.

Furthermore, each port (i.e. each detector input) may be an interface for a plurality of channels/lanes.

In some exemplary embodiments, each DRM module contains 12×100 G input ports, each 100 G input port having four channels/lanes at a 25 G data rate.

Concentrators in electrical switching are known, but these work entirely in the electrical domain. The present invention enables the advantages of such concentrators to be achieved for the switching of optical signals. The passive optical switch fabric may be a full mesh fabric.

Optionally, the passive optical router comprises: an optical full-mesh fabric (C5); a pre-mesh arrayed waveguide grating (AWG) stage (C4) configured to connect each output of each of the first plurality of DRMs to the optical full-mesh fabric; and a post-mesh AWG stage (C5) configured to connect the optical full-mesh fabric to each input of each of the second plurality of DRMs.

Optionally, the pre-mesh AWG stage comprises a plurality of AWGs.

Optionally, the pre-mesh AWG comprises one AWG for each of the first plurality of DRMs.

Optionally, the post-mesh AWG stage comprises a plurality of AWGs.

Optionally, the post-mesh AWG stage comprises one AWG for each of the second plurality of DRMs.

Optionally, each DRM of the first plurality of DRMs (C3) comprises: one or more detector(s) configured to convert an optical input signal into an electrical output signal; one or more modulator(s) configured to receive an unmodulated tunable laser input and to generate a modulated optical signal having the wavelength of the tunable laser input and containing the information from the electrical output signal from a respective detector; and an ASIC electrically connecting the electrical output of the detector(s) to the electrical input of the modulator(s), the ASIC configured: to control the concentration of optical signals destined for each of the second plurality of DRMs (C7); and to control the path of the optical signal through the passive optical router by selecting the wavelength required.

Optionally, each DRM of the second plurality of DRMs (C7) comprises:
one or more detector(s) configured to convert an optical input signal into an electrical output signal; one or more modulator(s) configured to receive an unmodulated tunable laser input and to generate a modulated optical signal having the wavelength of the tunable laser input and containing the information from the electrical output signal from a respective detector; and an ASIC electrically connecting the electrical output of the detector to the electrical input of the modulator, the ASIC configured: to select which output port within that DRM (C7) the optical signal should be sent to; and to control the wavelength of the output signal.

Optionally, the passive optical router comprises: an AWG (D3); a pre-AWG optical full-mesh fabric (D2); and a post-AWG optical full-mesh fabric (D4).

Optionally, the AWG comprises one AWG for each of the first plurality of DRMs.

Optionally, each DRM of the first plurality of DRMs (D1) comprises: one or more detector(s) configured to convert an optical input signal into an electrical output signal; one or more modulator(s) configured to receive an unmodulated tunable laser input and to generate a modulated optical signal having the wavelength of the tunable laser input and containing the information from the electrical output signal from a respective detector; and an ASIC electrically connecting the electrical output of the detector(s) to the electrical input of the modulator(s), the ASIC configured: to control the concentration of optical signals destined for each of the second plurality of DRMs (C7); and to control the path of the optical signal through the passive optical router by selecting the wavelength required.

Optionally, each DRM of the second plurality of DRMs (D5) comprises:
one or more detector(s) configured to convert an optical input signal into an electrical output signal; one or more modulator(s) configured to receive an unmodulated tunable laser input and to generate a modulated optical signal having the wavelength of the tunable laser input and containing the information from the electrical output signal from a respective detector; and an ASIC electrically connecting the electrical output of the detector to the electrical input of the modulator, the ASIC configured: to select which output port within that DRM (D5) the optical signal should be sent to; and to control the wavelength of the output signal.

In some embodiments, M=N.

In some embodiments, M≠N. M may be more than N or M may be less than N.

Optionally, the optoelectronic switch is configured to function as an optoelectronic circuit switch.

Optionally, the optoelectronic switch is configured to function as an optoelectronic packet switch.

Such a packet switch may include burst switching (i.e. switching of signals larger than a single packet and possibly of fixed duration) and cell switching (i.e. switching of signals smaller than a single packet and of fixed duration).

The choice of circuit switch or packet switch will determine the exact implementation of the DRMs and the method of controlling the switch. When operated as a circuit switch, the DRM need not contain any packet processing or packet buffering capabilities; it only needs to perform R3 signal regeneration and wavelength conversion.

Such R3 signal regeneration and wavelength conversion capabilities may also be present where the optoelectronic switch is a packet switch.

The choice of wavelengths may be provided to the plurality of first or second DRMs from outside the switch using a dedicated control input to the DRMs. When used as a circuit switch, if DRM X is connected to DRM Y, then it is necessary to map all of the client inputs into DRM X to outputs of DRM Y.

When operated as a packet switch, the DRM must contain packet processing and packet buffering capabilities. There are two directions, client-to-fabric, and fabric-to-client, and the DRM handles these two cases differently. When a DRM receives a packet from a client input port, it processes the packet to determine which output DRM the packet needs to be transmitted to, buffers the packet until the DRM is able to retransmit the packet over the single fabric output port. When a DRM receives a packet from another DRM over its fabric input port, it retransmits the packet over one of its client output ports. Like in the circuit switch use case, the DRM is controlled using via an external control input. However, for the packet switch use case, the DRM also provides information about packets stored in its buffers, so that a switch arbiter can make control decisions.

The optoelectronic switch may be at least partially fabricated as a silicon-on-insulator photonic chip.

According to a second aspect of the present invention, there is provided, a detector remodulator for use in controlling a path through an optical router of an optoelectronic switch, the DRM comprising: one or more detector(s) configured to convert an optical input signal into an electrical output signal; one or more modulator(s) configured to receive an unmodulated tunable laser input and to generate a modulated optical signal having the wavelength of the tunable laser input and containing the information from the electrical output signal; and an ASIC electrically connecting the electrical output of the detector(s) to the electrical input of the modulator(s), the ASIC configured: to control the concentration of optical signals destined for a group of outputs of the optical router; and to control the path of the optical signal through the optical router by selecting the wavelength required.

This preferably selects the path to a device such as a further DRM, the further DRM de-concentrating the signal to select the specific output port.

Further optional features of the invention are set out below.

BRIEF DESCRIPTION OF THE DRAWINGS

Embodiments of the invention will now be described by way of example with reference to the accompanying drawings in which.

DETAILED DESCRIPTION AND FURTHER OPTIONAL FEATURES OF THE INVENTION

Figure 1:
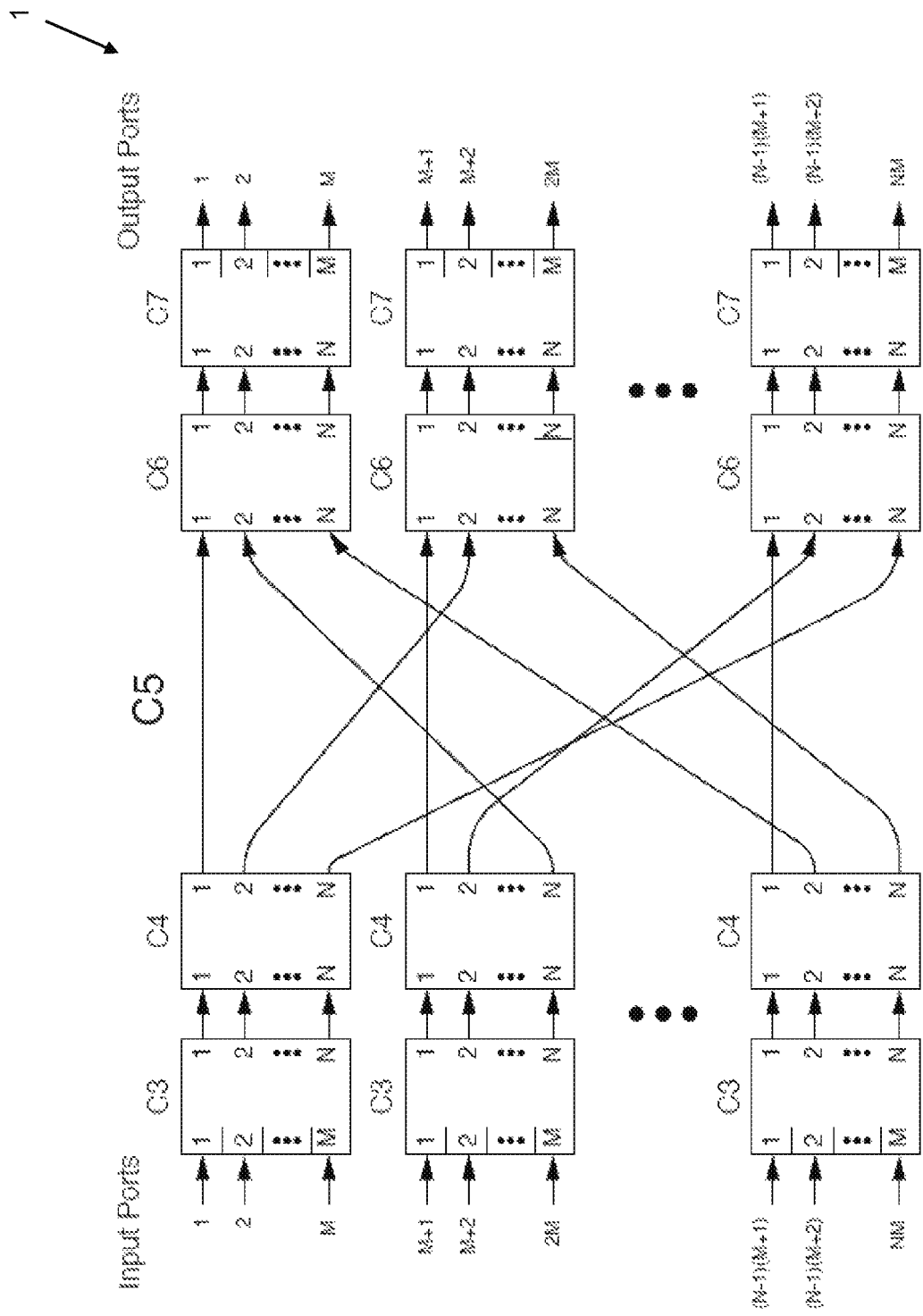
FIG. 1 shows a schematic diagram of an optoelectronic switch according to the present invention, the optoelectronic switch having an unfolded configuration.

FIG. 1 shows an optoelectronic switch according to the present invention. The switch takes the form of an NM-port unfolded optoelectronic switch constructed with a DRM-AWG-AWG-DRM architecture, where N is the number of DRMs and M is the number of client facing input/output port pairs on each DRM.

The optoelectronic switch 1 comprises a first plurality of DRMs C3, a pre-mesh AWG stage C4, a full-mesh fabric C5, a post mesh AWG stage C6, and a second plurality of DRMs C7.

The input ports of each of the first plurality of DRMs C3 are configured to receive optical signals from the input ports of the optoelectronic switch. The outputs of the first plurality of DRMs C3 are optically connected to the inputs of the pre-mesh AWG stage; the outputs of the pre-mesh AWG stage are optically connected to the inputs of the optical full-mesh fabric C5, the outputs of the full mesh fabric are optically connected to the inputs of the post-mesh AWG stage, and the outputs of the post-mesh AWG stage are optically connected to the inputs of the second plurality of DRMs. The outputs of the second plurality of DRMs lead to the output ports of the optoelectronic switch.

Each AWG stage is optionally made up of a plurality of AWGs, one AWG per DRM.

In all of the figures shown, each "DRM" is actually a DRM module which may comprise a plurality of detectors and a plurality of modulators, a common electrical circuitry being shared amongst the detectors and the modulators, the common electrical circuitry including a common control signal.

Signals input at ports 1-M are received at one of the first plurality of DRMs C3. Here they are buffered according to their desired destination port. The buffering can be achieved by grouping the output ports according to the destination DRM module. For example all signals (such as packets in a packet switch) for the DRM output ports 1-M will be aggregated together and concentrated. The concentrated data can be sent at one or more of the available wavelengths of the DRM with destination AWG C6 (according to the spectral properties of the AWG C4). Each of C3's N channels is retransmitted using a unique wavelength within the free spectral range of a cyclic AWG C4. The retransmitted channels are connected to C4's N input ports via N parallel optical waveguides. Due to the proper selection of wavelengths, all N channels are wavelength division multiplexed to a single C4 output port. One advantage of this approach is that it eliminates coherent crosstalk in the C4 AWG because each input has a unique wavelength. All N channels then travel over a single optical waveguide as part of an optical full mesh fabric C5. All N channels then enter a single input port of an AWG C6, where the N channels are wavelength division demultiplexed onto N separate AWG output ports. These N channels then travel over N parallel optical waveguides to DRM C7, where they are then deconcentrated to be transmitted out of their desired output port(s) of the destination DRM.

The switching function happens in two steps. Firstly, the range of output port is selected (1-M, M+1-2M, etc.) and the data for a given range are buffered. (Note that each range corresponds in the exemplary embodiment to the outputs of the DRMs 7 of the switch). Thus, the choice of wavelengths on each of the outputs of a single DRM C3 selects a specific DRM C7 and its receiver photodiodes. Secondly, the electronics inside of the DRM C7 selects the specific output port for each packet of data.

In this first architecture described, which may be termed the DRM-AWGR-AWGR-DRM architecture, the architecture comprises a different tunable laser per DRM fabric channel. The principal advantage of this architecture is that the AWGs do not suffer from crosstalk because each AWG input is on a unique wavelength. Another important advantage compared to previous optoelectronic switches is that there are far fewer components, i.e. fewer DRMs, fewer lasers, fewer AWGs, and less fiber. A third advantage is that the DRMs and AWGs can be fabricated onto the same device to reduce cost, power consumption, and area.

Figure 2:
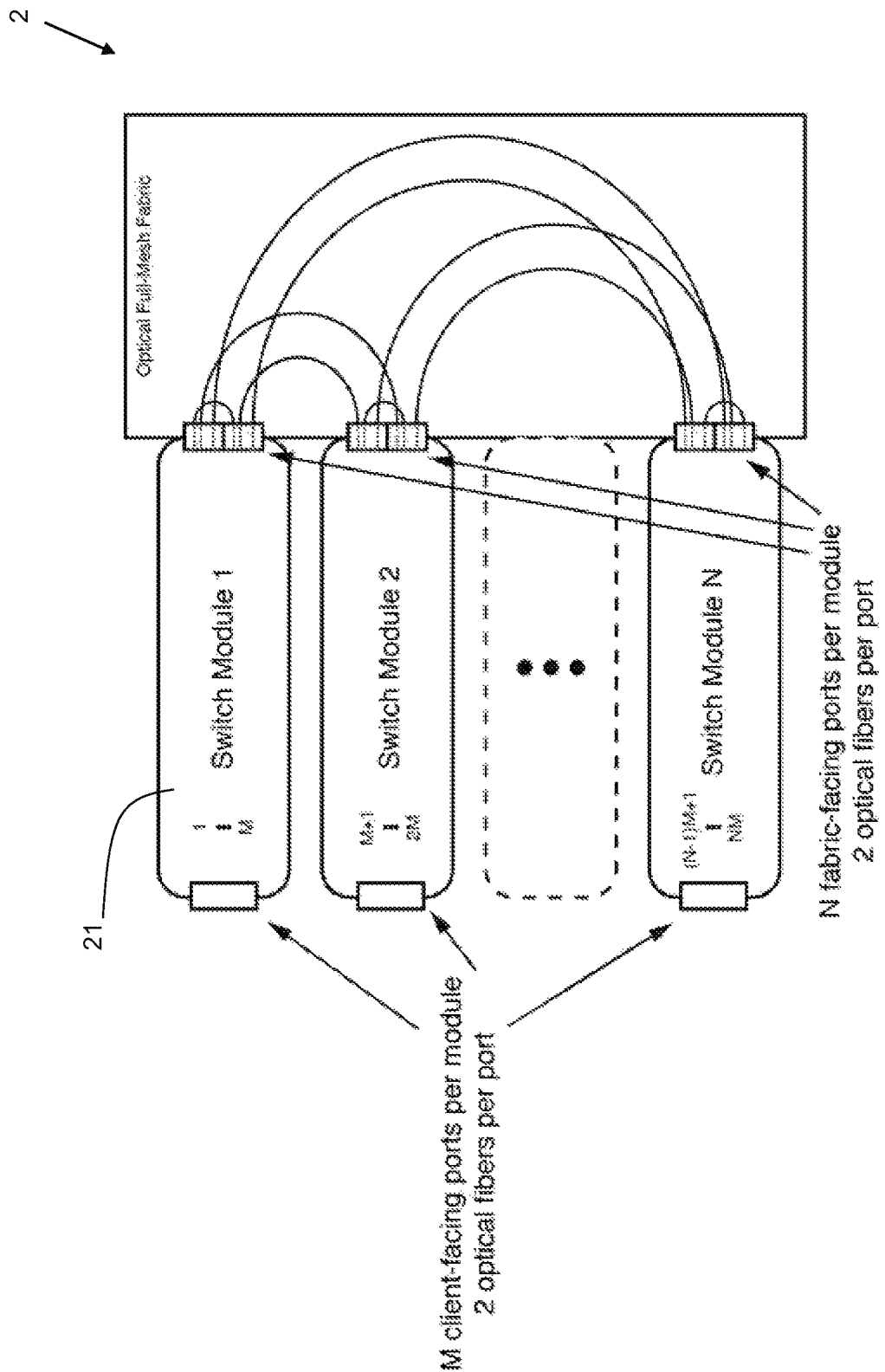
FIG. 2 shows a schematic diagram of an optoelectronic switch according to the present invention, the optoelectronic switch having a folded configuration.

The optoelectronic switch 2 of FIG. 2 differs from that of FIG. 1 in that it has a folded configuration. The optoelectronic switch is partitioned into up to N switch modules, connected to a single, common optical full-mesh fabric backplane via optical connectors. Each switch module contains M ports, and a fully deployed switch contains NM ports.

Figure 3:
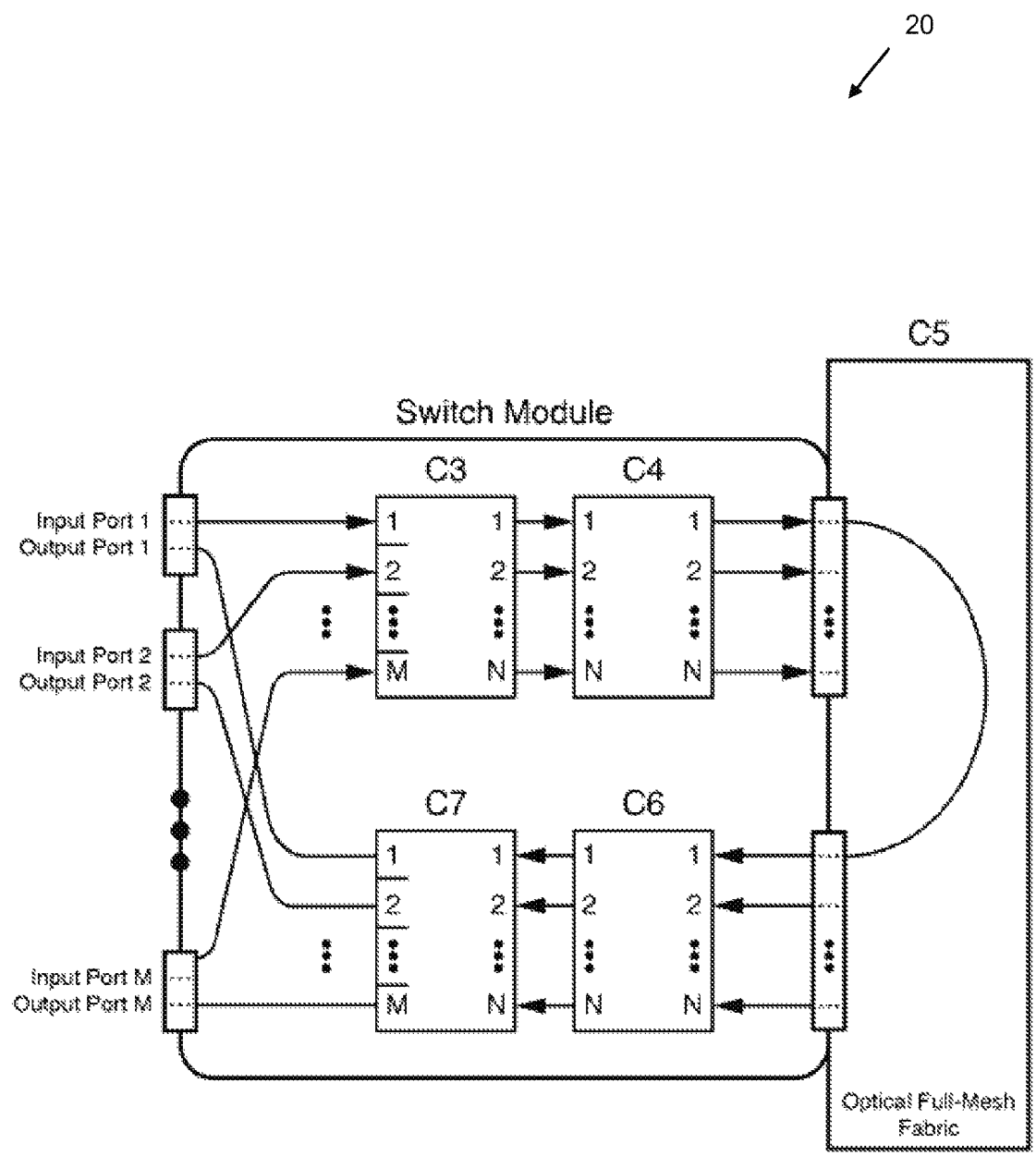
FIG. 3 shows a schematic diagram of an optoelectronic switch module.

FIG. 3 shows the composition of a single optoelectronic switch module 21 which makes up an optoelectronic switch of the present invention such as that shown in FIG. 2. In the switch module shown in FIG. 3, M client inputs are connected to DRM C3's inputs, and the M client outputs are connected to DRM C7's outputs.

Figure 4:
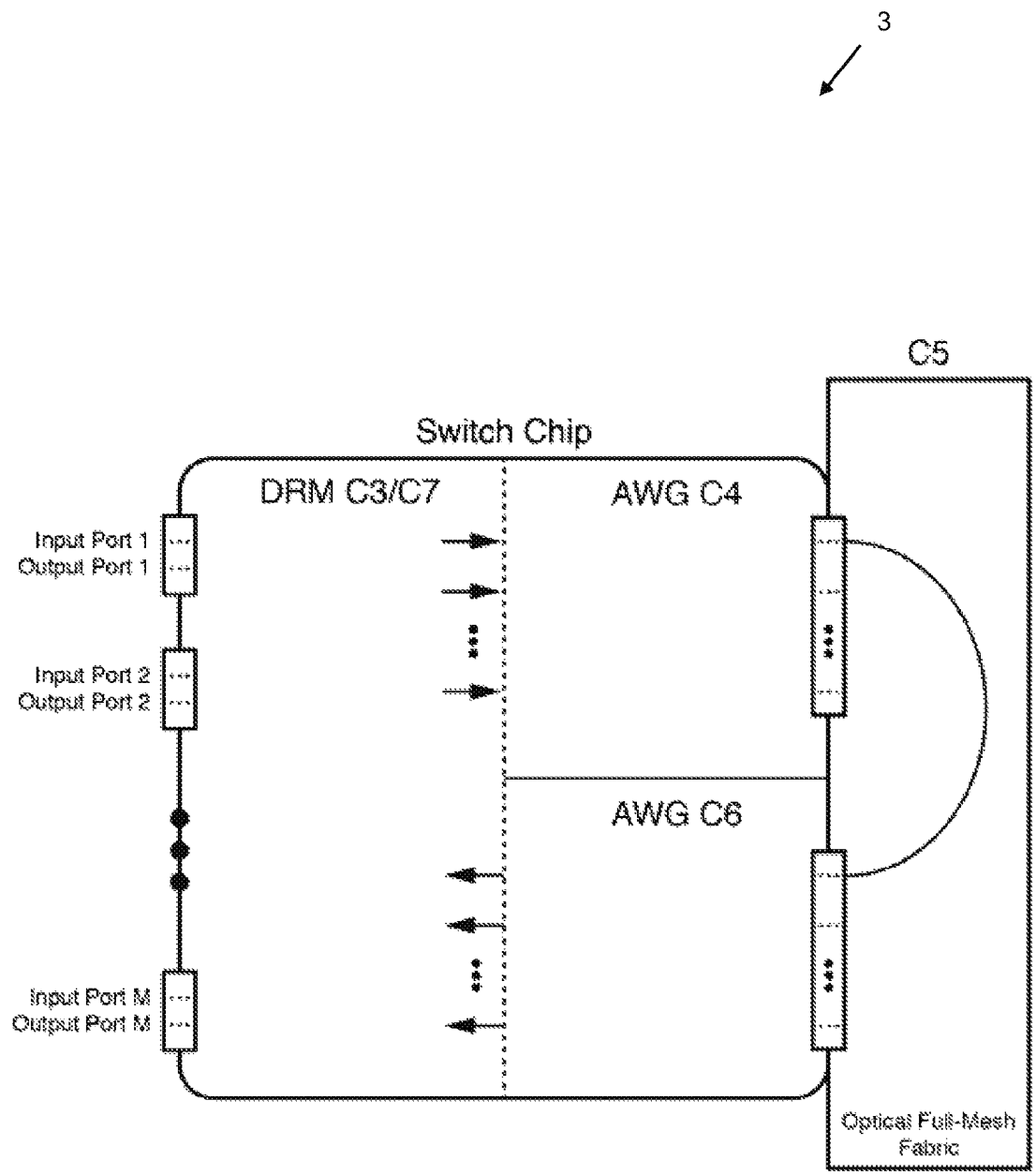
FIG. 4 shows an example of wavelength routing for an N×N AWG where N=4.

FIG. 4 shows an alternative DRM-AWGR-AWGR-DRM switch chip 3, which differs from FIG. 3 in that it has a more compact configuration because all of the electronics and photonic devices are integrated onto a single chip. The plurality of first DRM C3 and second DRM C7 modules are located within a single device module DRM C3/C7.

This means that the client interface includes co-located input and output ports. Internally, waveguides connect the DRM C3/C7 to the AWG C4 and AWG C6 portions of the chip. The fabric ports of the chip are the fiber outputs of the AWG C4 connector and the fiber inputs of the AWG C6 connector, shown as connecting to an optical full-mesh fabric C5.

Figure 5:
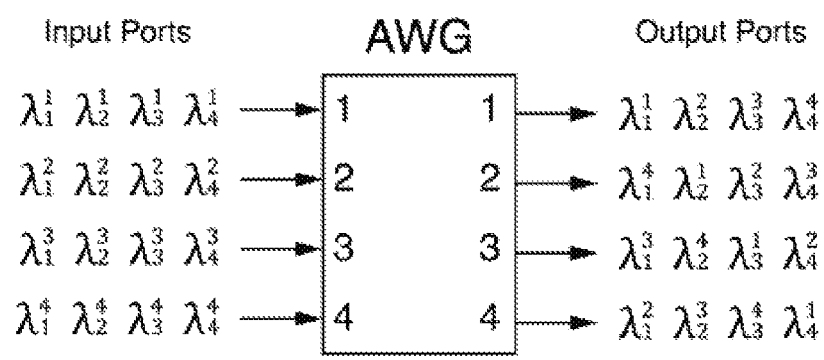
FIG. 5 shows a schematic diagram of an alternative optoelectronic switch according to the present invention, the optoelectronic switch having a folded configuration.

FIG. 5 shows an example of wavelength routing for an N×N AWG of the optoelectronic switch. In the example shown, N=4, but it should be understood that other values of N are envisaged. From this figure, the operation of the AWGs in the embodiments described herein can be better understood. Wavelengths are selected at the outputs of DRM C3 in order to route all of DRM C3's N channels onto a single output port of AWG C4. In this example, as parameter N is set to 4 there are four valid combinations of wavelengths.

Firstly, if DRM C3's outputs are set to wavelengths 1, 2, 3, and 4, respectively, then all four wavelengths will be multiplexed onto AWG C4 output port 1. Secondly, if DRM C3's outputs are set to wavelengths 2, 3, 4, and 1, respectively, then all four wavelengths will be multiplexed onto AWG C4 output port 2. Thirdly, if DRM C3's outputs are set to wavelengths 3, 4, 1, and 2, respectively, then all four wavelengths will be multiplexed onto AWG C4 output port 3. Finally, if DRM C3's outputs are set to wavelengths 4, 1, 2, and 3, respectively, then all four wavelengths will be multiplexed onto AWG C4 output port 4.

While the input ports of DRM C3 and the output ports of DRM C7 are shown as single channels, it is noted that these single logical channels can be implemented as parallel physical channels.

An alternative optoelectronic switch architecture described below with reference to FIG. 6. This embodiment may be known as a DRM-AWGR-DRM architecture.

A major difference which arises from the different architecture is the fact that the optoelectronic switch uses the same tunable laser for all of a DRM's fabric channels. The principal advantage of this architecture compared to the earlier invention described in R8/R9 is that it has better scaling. The total number of switch ports is equal to the number of client ports on a single DRM times the number of DRMs in the switch. A secondary advantage compared with the DRM-AWGR-AWGR-DRM architecture is that optical insertion loss is minimized because the longest path is through a single AWG instead of through two AWGs.

Figure 6:
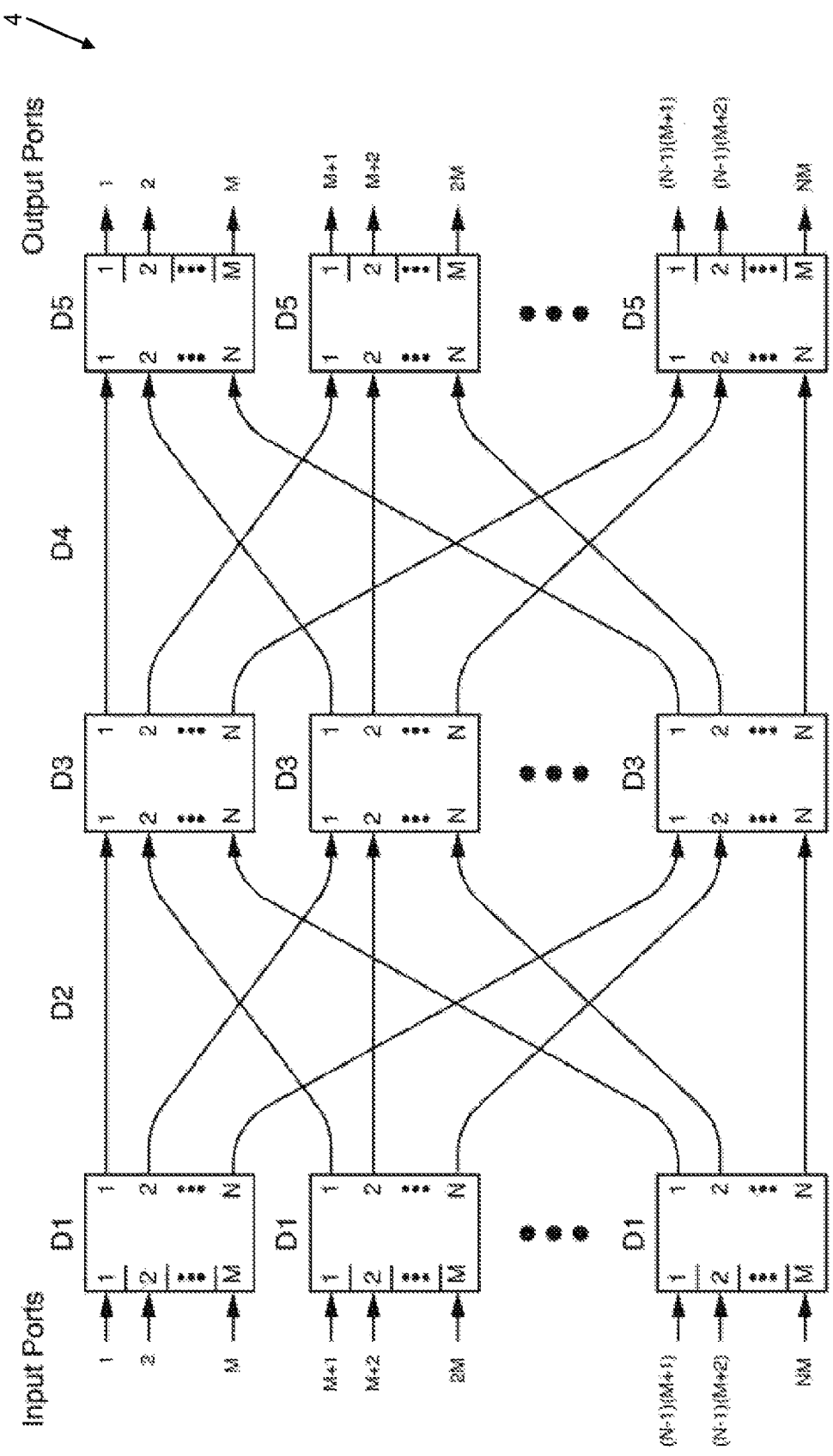
FIG. 6 shows a schematic diagram of an alternative optoelectronic switch according to the present invention, the optoelectronic switch having an unfolded configuration.

FIG. 6 shows an optoelectronic switch 4 according to the present invention. The switch takes the form of an NM-port unfolded optoelectronic switch constructed with a DRM-AWGR-DRM architecture, where N is the number of DRMs and M is the number of ports on each DRM.

The optoelectronic switch comprises a first plurality of DRMs D1, a pre-AWG optical full-mesh fabric D2, an AWG, a post-AWG optical full-mesh fabric and a second plurality of DRMs.

The input ports of each of the first plurality of DRMs are configured to receive optical signals from the input ports of the optoelectronic switch. The first plurality of DRMs D1 are optically connected to the inputs of the pre-AWG optical full-mesh fabric; the outputs of the pre-AWG full mesh fabric are optically connected to the inputs of the AWGs, the outputs of the AWGs are optically connected to the inputs of the post-AWG optical full-mesh fabric, and the outputs of the post-AWG optical full-mesh are optically connected to the inputs of the second plurality of DRMs. The outputs of the second plurality of DRMs lead to the output ports of the optoelectronic switch.

An input signal enters one of the optoelectronic switch input ports at DRM D1, where the signal is concentrated to a single N-channel output port, and where N is a positive integer. Each of D1's N channels is then retransmitted using the same wavelength across all N AWGs D3. D1 is connected to D3 via a waveguide shuffle D2. The retransmitted channels are connected to DRM D5's N input ports via N parallel optical waveguides D4. One advantage of this approach is that it allows decoupling the number of ports on a single DRM from the total number of DRMs in the optoelectronic switch. These N channels then travel over N parallel optical waveguides to DRM C7, where they are then deconcentrated before being transmitted out of their desired output port(s) of the destination DRM.

The switching function therefore happens in two steps. First, the choice of wavelength on all of the outputs of a single DRM D1 selects a specific DRM D5 receiver. Second, the electronics inside of the DRM D5 selects the desired output port(s) of the DRM.

Figure 7:
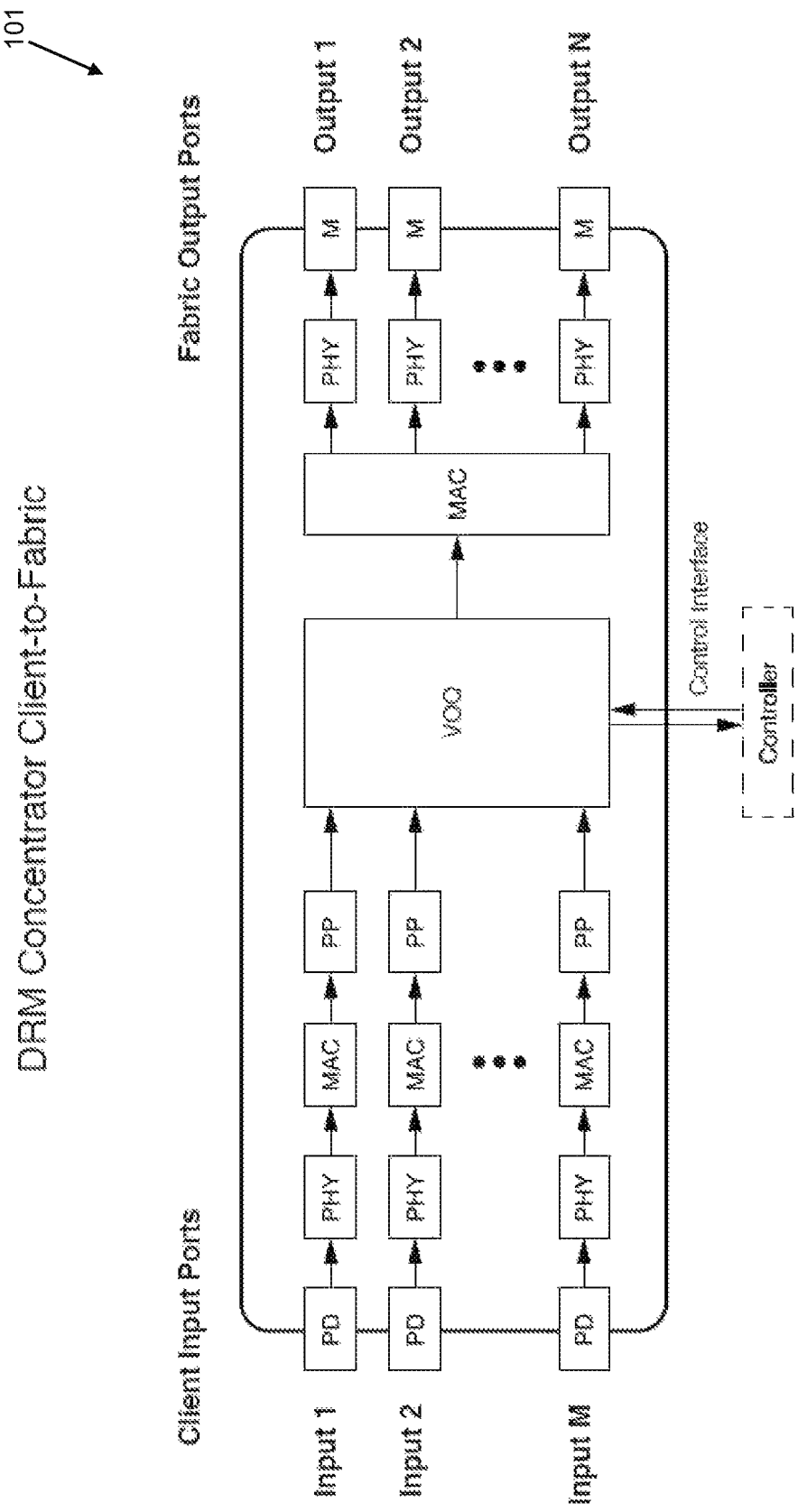
FIG. 7 shows a schematic diagram of an example of a client-to-fabric DRM suitable for use as one of the DRMs of the first plurality of DRMs of the present application.
Figure 8:
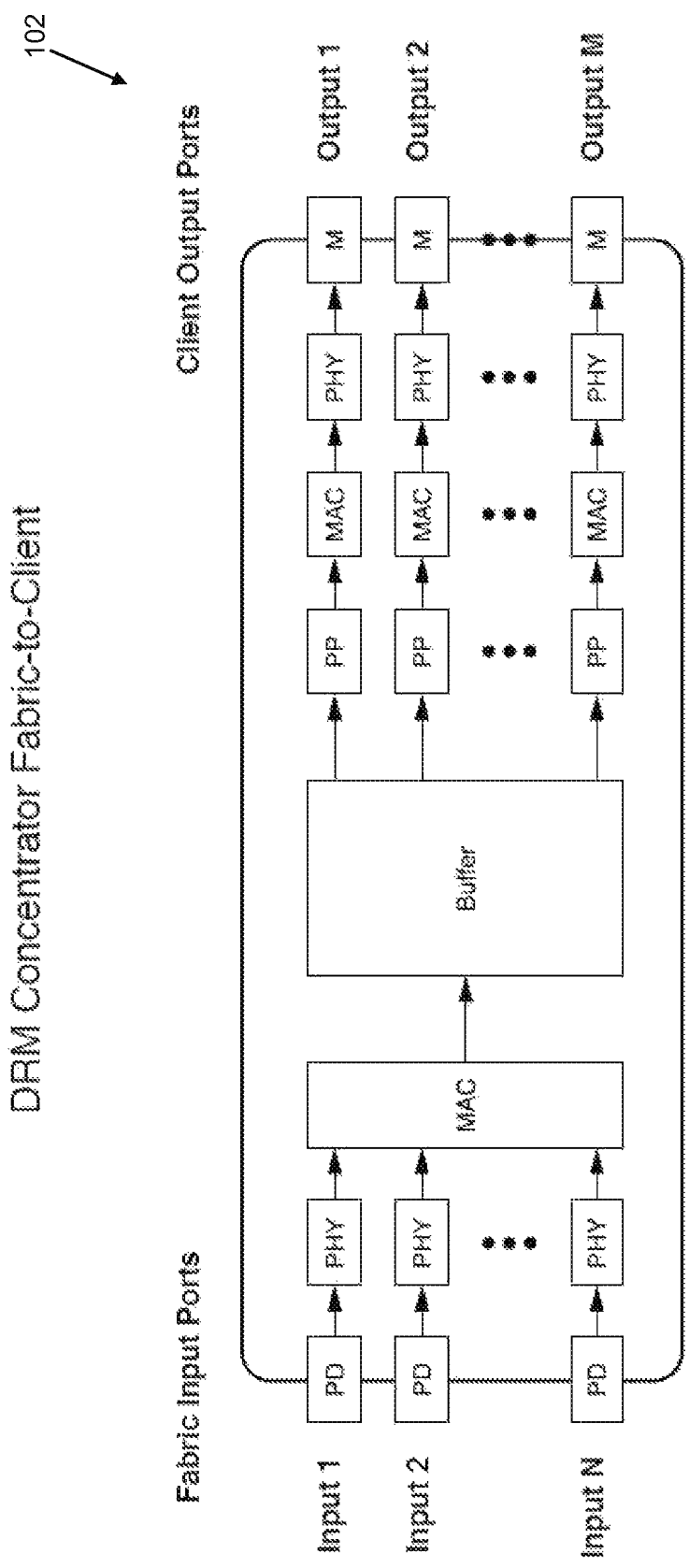
FIG. 8 shows a schematic diagram of an example of a fabric-to-client DRM suitable for use as one of the DRMs of the second plurality of DRMs of the present application.

The concentration and deconcentration processes are better understood by reference to FIGS. 7 and 8 respectively which show examples of the DRMs with concentrator/deconcentrator capability. The concentrator/deconcentrator functionality in the DRMs enables a single logical output port to be implemented by way of the N physical output ports.

FIG. 7 shows an example of a client-to-fabric DRM 101 suitable for use in the present invention, for example as one of the DRMs in the first plurality of DRMs C3, D1. The DRM shown is made up of a plurality of photodetectors (PD) and a plurality of modulators (M) which share common circuitry.

Each photodetector is configured to receive packets encoded as optical signals via respective input ports (Input 1, Input2, Input M) and to convert the optical signals into packets encoded as electrical signals which are output from the detector. The packet proceeds through a respective client-side Physical Layer PHY then a respective client-side Media Access Control Layer MAC to a packet processor PP. There is a separate packet processor PP per client input port and each of these packet processors examines a packet it receives and determines from which output port of the optoelectronic switch the packet is to be forwarded.

Packet processing could be achieved by marking the packet with a desired output port number. Alternatively, it could be achieved by writing the output port number to a global scoreboard for recordal and referencing from a global scoreboard.

This could be implemented for example by marking the packet with the output port number, or by recording the output port number for this packet in a scoreboard.

The packet proceeds from each of the packet processors to a virtual output queue VOQ which stores the packets in a manner that allows the packets to be retrieved according to their destination DRM.

The packet proceeds from the separate packet processors to a single fabric-side MAC, the fabric-side MAC determining which and how many fabric-side PHYs the packet should then proceed to. From the fabric-side PHYs, the electrically encoded packets then travel to the corresponding modulators where the signals are converted from the electrical to the optical domain and transmitted out of one or more of the fabric output ports (Output 1, Output 2, Output M).

Overall control of the concentration process is achieved via the client controller which is configured to talk to the VOQ of each DRM.

FIG. 8 shows an example of a fabric-to-client DRM 102 suitable for use in the present invention, for example as one of the DRMs in the second plurality of DRMs C7, D5. The DRM shown is made up of a plurality of detectors and a plurality of modulators which share common circuitry. A plurality of detectors (PD) are each configured to receive packets encoded as optical signals from the optical switch fabric via respective fabric input ports (Input 1, Input 2, Input M) and to convert these optical signals into packets encoded as electrical signals, the electrical signals being output from the detectors. The packets (encoded as electrical signals) are then processed according to procedures known in the art before being deconcentrated and transmitted out of the desired port as an optical signal via a modulator M.

In more detail, the packets (encoded as electrical signals) proceed to a fabric-side PHY; each photodetector having a respective fabric-side PHY. From each PHY, the packet proceeds to a single MAC.

From the single MAC, the packet (encoded as an electrical signal) proceeds to a buffer, where the signal is demultiplexed.

After demultiplexing, the packets proceed via a respective packet processor PP, a respective Media Access Control Layer MAC, a respective Physical Layer PHY, and finally on to a respective client-side modulator M.

In this deconcentrating DRM set-up, there is one packet processor per DRM output port. The packet processors may provide the function of recombining data from the fabric back into a single packet.

In the embodiments described above, it is important to note that in the optical domain, the system receives 1 packet-per each of the N ports. However, the concentrator acts, via the single MAC, as a single logical switch in the electrical domain.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the spirit and scope of the invention.

All references referred to above are hereby incorporated by reference.

The invention claimed is:

1. A detector remodulator for use in controlling a path through an optoelectronic switch, the detector remodulator comprising:
    one or more detectors configured to convert an optical input signal into an electrical output signal;
    one or more modulators each having an electrical input and being configured to receive an unmodulated laser input and to generate a modulated optical signal having the wavelength of the laser input and containing information from the electrical output signal from a respective detector; and
    an ASIC electrically connecting the electrical output of the detectors to the electrical input of the modulators, the ASIC configured:
        to control the concentration of signals destined for a group of outputs of the optoelectronic switch; and
        to control the path of the optical signal through the optoelectronic switch.

2. The detector remodulator of claim 1, wherein said one or more detectors is a plurality of detectors and said one or more modulators is a plurality of modulators.

3. The detector remodulator of claim 2, comprising a control interface through which the ASIC is configured to communicate with a single controller to control the path taken by all optical input signals received by all of said detectors through the optoelectronic switch.

4. The detector remodulator of claim 2, comprising a plurality of packet processors; each packet processor being located downstream from a respective one of the plurality of detectors.

5. The detector remodulator of claim 4, wherein the ASIC includes a virtual output queue configured to store packets from the plurality of packet processors according their destination; each possible destination corresponding to a group of outputs of an alternative detector remodulator;
    wherein the virtual output queue is configured to receive data from the outputs of all of the plurality of packet processors.

6. The detector remodulator of claim 1, wherein the ASIC includes one or more of the following:
    a receiver circuit, a transimpedance circuit, and a modulator driver.

7. The detector remodulator of claim 1, wherein the ASIC includes signal regeneration circuitry.

8. The detector remodulator of claim 7, wherein the signal regeneration circuitry includes signal retiming and/or signal reshaping.

* * * * *